March 25, 1952     R. CHILTON     2,590,232
MULTISPEED TRANSMISSION AND AUTOMATIC
TRANSMISSION CONTROL Original Filed June 23, 1943     3 Sheets-Sheet 3

INVENTOR
ROLAND CHILTON.
BY
ATTORNEY

Patented Mar. 25, 1952

2,590,232

UNITED STATES PATENT OFFICE 2,590,232

MULTISPEED TRANSMISSION AND AUTOMATIC TRANSMISSION CONTROL

Roland Chilton, Ridgewood, N. J., assignor to Curtiss-Wright Corporation, a corporation of Delaware Original application June 23, 1943, Serial No. 492,165, now Patent No. 2,416,154, dated February 18, 1947. Divided and this application October 26, 1946, Serial No. 705,955

26 Claims. (Cl. 74—336)

This invention is a division of my co-pending application Serial No. 492,165 filed June 23, 1943 now Patent No. 2,416,154.

The invention includes a series of side-by-side gears having similar internal clutch teeth through which a pair of toothed clutch members shift successively from one gear to the next, i. e., the tooth clutches are organized to engage and disengage a specific gear from and to either side thereof. To permit this through-shifting action, special synchronizing devices are provided which permit any gear to be engaged from either side of its clutch teeth and which allow the engaging member to travel on through and beyond the gear last engaged. Although the special synchronizing devices are herein described in connection with a transmission having two toothed clutch members, this feature of the invention may be embodied in a transmission in which a single toothed clutch member is selectively engageable with a series of gears.

Another object of this invention comprises a novel form of automatic shift control for the transmission in which means are provided for automatically shifting the transmission speed ratio in response to changes in engine torque and/or engine or valve speed.

Other objects of the invention will be obvious from, or will be pointed out in, the following description with reference to the drawings in which Figures 1 and 2 are diagrammatic, omitting certain constructional details so as to simplify the drawings for clearer illustration of essential elements and mode of operation, accordingly:

Figure 6 is a plan view of the hydraulic valving member on which the cam rotates;

Figures 1, 7:
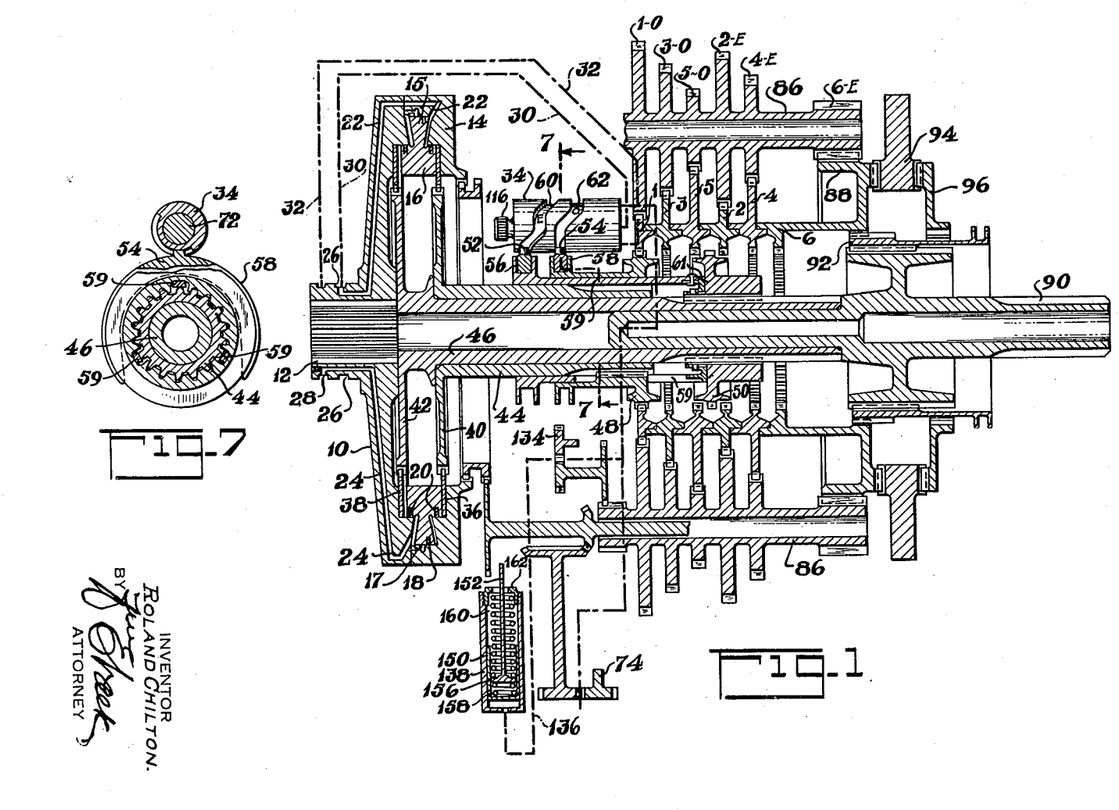
Figure 1 is a diagrammatic cross-section on the axis of the transmission.
Figure 7 is a transverse section on the line 7—7 of Figure 1.

Referring first to Figure 1, 10 designates a clutch housing member, which may be the flywheel of an associated engine, mounted on the crankshaft thereof (not shown) by the hub 12. The flywheel or clutch housing 10 has a cover 14 and these members comprise similar opposed annular cylinders in which is fitted a stepped annular piston 15 including a clutch pressure plate 16. Said piston-pressure plate member is provided with sealing rings 18 and 20, as shown, and an axially slidable spline drive 17 is provided between the piston 15 and the clutch housing. Passages 22 and 24 communicate respectively with the right and lefthand sides of the piston and with collecting grooves 26 and 28 in the hub 12. This hub operates in a bearing (not shown) to which oil lines, indicated by the dotted lines 30 and 32, supply oil pressure under control of the combined shifting-cam and oil pressure control valve assembly 34, later to be described in detail.

Figures 2, 3, 4, 5:
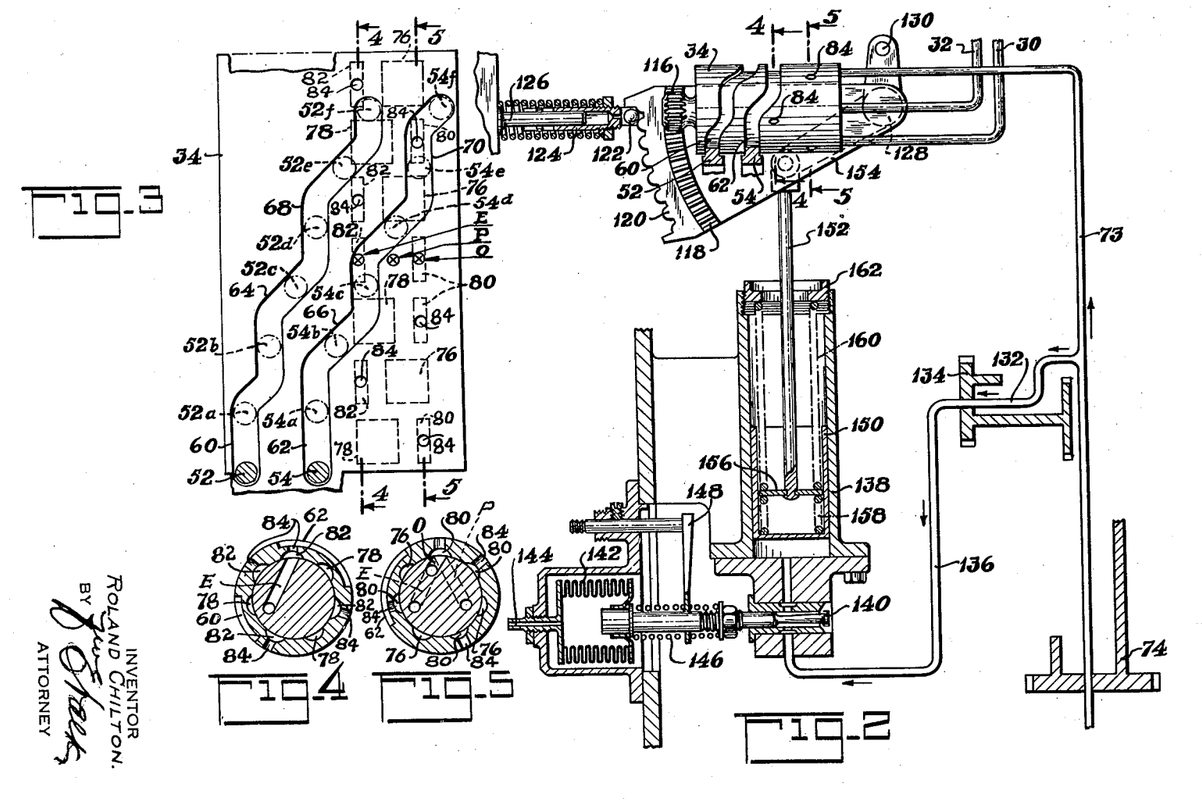
Figure 2 is a diagrammatic representation of a control cam and associated hydraulic system for automatic shift.
Figure 3 is a developed view of the control cam.
Figures 4 and 5 are cross-sections through the cam on the lines 4—4 and 5—5 of Figures 2 and 3 respectively.

Assuming this system to be full of oil (but without external pressure) it will be seen that the centrifugal force generated in the rotating oil ducts 22 and 24, which deliver to opposite sides of the piston 15, will be equal and opposite so that this centrifugal pressure is balanced and produces no tendency to move the piston pressure-plate members 15, 16. However, the cam-valve assembly 34 is arranged to supply oil pressure to either the oil line 30 or the oil line 32 while venting the other to atmosphere, as later to be described. It will be obvious that whenever such oil pressure is applied through ducts 32 and 24, such pressure will devolve on the lefthand side of the piston 15, moving it over to the position shown. The pressure-plate 16 cooperates reciprocally with separate driven clutch plates 36 and 38 arranged on either side. In the position shown in Figure 1, the cam-valve assembly 34 has applied pressure to the lefthand side of the piston 15 through the ducts 24 and 32 thereby engaging clutch plate 36 and freeing the clutch plate 38. These clutch plates are respectively splined to driving discs 40 and 42 rigid respectively with an outer hollow shaft 44 and an inner shaft 46. Splined to and shiftable along the outer shaft 44 is a toothed clutch shift member 48 and similarly shiftable along splines on the inner shaft 46 is a second toothed clutch shift member 50. Leftward extensions of these shift members engage control collars 56 and 58 having cam follower stubs 52 and 54 engaged in shifting cam grooves 60 and 62 formed on the exterior of the cam-valve assembly 34 as shown. In the case of the shift member 50, actuated by the control collar 58, the connecting elements have to pass through and beneath the shift member 48 which is, accordingly, slotted to pass connecting bars 59 (best seen in the end views of Figures 7 and 9). These bars must rotate with the outer shaft 44 and shift member 48 and, accordingly, they have a rotatable connection indicated at 61 with the member 50 to permit different speeds of rotation. The shifting cam grooves 60 and 62 are shown in developed view in Figure 3 and will be seen to comprise helical shifting elements 64 and 66 interspaced with parallel or "dwell" elements 68 and 70. In Figures 2 and 3, the cam 34 has been rotated from its first speed position to a neutral position in which both sides of the piston 15 are vented to the atmosphere. The profiles and relationships of the two cam tracks is such that the two toothed clutch members 48 and 50 do not move simultaneously but in predetermined sequence, and this sequence is further correlated with the valving functions for the actuation of the friction clutches, as follows:

The cam-valve assembly 34 is mounted on a stationary valve member 72, Figure 6, having three alined holes E, P and O of which the hole P is a pressure inlet connected to an engine driven pump 74 (Figure 2) by a line 73 while the holes E and O connect to the lines 30 and 32 feeding respective sides of the clutch piston 15, as previously described. The holes E, P and O are indicated by crosses in Figure 3 which also indicates (in dotted lines) valve ports 76 and 78 cut in the interior of the cam and seen also in Figures 4 and 5. These ports serve to connect, at the proper time, the hole P to either the hole E or O and thus supply pressure to the respective sides of the clutch piston 15. At the same time, the other side of the piston 15 is vented to the atmosphere by narrower venting ports 80 and 82 which communicate with radial holes 84 drilled through the cam to permit the oil displaced from the inactive side of the piston to escape as the piston moves over from one position to another. The cam-valve assembly 34 is moved in shift increments of 1/7 of a turn corresponding to the circumferential spacing of the valve ports and cam profile elements and to the gear shift increments of the toothed clutches 48 and 50. Such incremental shift rotation of the cam may be produced by any desired manual means or by automatic shifting means later to be described, the operation of the parts so far described being the same for automatic as for manual shift.

Referring again to Figure 1, a plurality of gears 1, 3, 5, 2, 4, 6 will be seen arranged in axial series in the order written and each of these gears has identical clutch teeth engageable by the clutching shift member 48 in the case of gears 1, 3 and 5 and by the shift member 50 in the case of gears 2, 4 and 6 (the latter comprising a direct drive connection). The numbers assigned to these gears are the ordinal numbers of their relative gear ratios, 1 representing the lowest driven speed and 6 the highest (or direct drive) speed. These relative driven speeds are obtained through layshaft gears 1-O, 3-O, 5-O, 2-E, 4-E and 6-E rigid with a plurality of layshafts 86 mounted in suitable bearings (not shown). The final drive (except for direct drive gear #6) is always through the end layshaft gear 6-E which meshes with a gear 88 which is connected, for forward drive, to a final drive shaft 90 through a shiftable spline clutch 92. Reverse drive ratios are obtained through radial pinions 94 mounted in fixed bearings (not shown) and engaging a gear 96 which, accordingly, rotates in reverse direction to the gear 88. This gear 88 may be disengaged and the gear 96 engaged by moving the spline member 92 to the right whereby this particular embodiment comprises six forward and six reverse speeds. It will be noted that the gears of first, second, third, etc., ratios are not arranged axially in simple ordinal series but that the gears of the "odd" numbered ratios are adjacent at the left-hand end of the series while the "even" numbered gears are adjacent each other at the right-hand end of the series. These two gear clusters are conveniently referred to as the "odd" and "even" series and are engageable respectively by the member 48 and the member 50 which, as previously described, are independently connected to the clutch plates 36 and 38 respectively. These elements may be conveniently distinguished as belonging to the "odd" and "even" gear shift systems and the symbols "O" and "E" have, accordingly, been used on the drawing to quickly distinguish the elements belonging to these respective systems.

In the neutral position of the cam as illustrated in Figure 3, the cam has the lower end of its profile engaged with the respective cam follower stubs 52 and 54. In this position of the cam, port holes E and O and their associated ducts 30 and 32, respectively, are connected to respective vent ports 82 and 80 whereby both sides of the piston 15 are vented to the atmosphere and the piston rotates freely between the clutch plates 36 and 38. Also, in this position of the cam the toothed clutch member 50 is out of engagement with and immediately to the left of gear 2 (the first even gear) and the toothed clutch member 48 is in engagement with gear 1 (the first odd gear) although obviously no drive is being transmitted therethrough because of the disengagement of clutch plate 36. If desired, the lower end of cam groove 62 could be inclined so as to move the toothed clutch member 48 out of engagement with and to the left of gear 1.

Now in order to shift from neutral into first speed, the cam-valve assembly 34 is rotated a predetermined increment by means hereinafter described. This amounts to a predetermined downward movement of the cam development of Figure 3 such that the relative position of the cam grooves 60 and 62 and the cam followers 52 and 54 is as indicated by dotted lines at 52a and 54a respectively. This movement of the cam 34 imparts no movement to the toothed clutch engaging members 48 and 50 but moves one of the venting ports 82 out of alinement with hole E in valve member 72 and alines an adjacent vent port 82 therewith. At the same time, this movement of cam 34 moves one of the venting ports 80 out of alinement with hole O in valve member 72 and alines one of the ports 76 with holes P and O in this valve member to apply fluid pressure through ducts 32, 24 to the left side of piston 15, as illustrated in Figure 1. Thereupon the piston pressure plate 16 engages the clutch plate 36 to provide a drive through the outer shaft 44, toothed clutch member 48 and first speed gear 1. The relative positions of the cam grooves 60 and 62 relative to the cam follower stubs 52 and 54 for the speed drive ratios 1 to 6 are indicated in Figure 3 in dotted lines at 52a, 54a to 52f, 54f, respectively.

Movement of the cam-valve assembly to the second speed position first moves the toothed clutch member 50 into engagement with the gear 2 without yet moving the already engaged member 48 and, when the engagement with gear 2 is complete, further continued movement of the cam will reverse the hydraulic clutch pressure on the piston 15 thus quickly moving the pressure plate 16 to the left, disengaging the "odd" clutch 36 and engaging the "even" clutch 38 thereby promptly transferring the drive from the engaging member 48 to the engaging member 50 (but only after this member has been fully engaged). The shift increment to second speed is completed by further movement of the cam during which the previously engaged selector member 48 is moved to the right into neutral position (but without other change). The cam-valve assembly 34 for each shift is moved through (in this case) one-seventh of a turn to complete this whole cycle of events for any shift. It will be seen, for example, that we now have the engaging member 48 intermediate gears 1, 3 while the member 50 is engaged with gear 2 so that should the cam movement be retracted over the first shift just described, the parts would be restored to the position shown. On the other hand, should another increment of cam shift movement be desired (the increment into third gear), it will be seen that the appropriate "odd" engaging member 48 is in neutral ready for movement into this gear. In other words, when any gear (except the end ratios 1 and 6) has been engaged by the appropriate shift member, the other member is located in neutral between the gears of ordinal numbers next above and below the engaged gear and is therefore ready for shifting into the next higher or lower gear, as desired, by forward or backward rotation of the cam-valve assembly. It will be further noted that the entire sequence of shifting events is correlated by the cam tracks 60 and 62 and the associated valve ports 76, 78, 80 and 82, these being pre-formed in the cam-valve assembly 34 to give the appropriate timing and sequence as described.

In the diagrammatic illustration of Figure 1, and in order to simplify the showing, the "neutral" spaces between the clutch teeth of adjacent gears appear empty. Actually, synchro-mesh devices are disposed in these spaces but these could only be clearly shown in the enlarged views of Figures 8 to 11. These "synchro-mesh" devices prevent the engagement of the shift members 50 and 48 with a gear until said devices have produced synchronization, and in this respect they may involve the usual delay in engagement. However, it is an essential of the present invention that while this synchronizing interval is being absorbed before any new gear can be engaged, the power is still being continuously applied to the vehicle because the previous gear is not disengaged until synchronization and selector engagement of the next gear is completed. Thereupon the respective clutching members 48 and 50 will be rotating at different speeds as permitted by the friction clutch organization whereby only one clutch is engaged leaving the other always free, as previously described. Upon completion of synchronization and engagement of the new gear, the hydraulic system transfers the clutch load to the friction clutch of that gear simultaneously releasing the friction clutch of the previously operating gear so that the shift member thereof may be moved to neutral by the cam, all as previously described.

Recapitulating; the sequence is:

(a) Synchronizing a new gear ratio
(b) Engaging the same
(c) release of the friction clutch of the previous ratio
(d) Engagement of the friction clutch of the new ratio
(e) Movement of the shift member of the previous ratio to neutral.

Only the first operation (a) absorbs any appreciable time, but regardless of how long this synchronizing interval may be, the vehicle is being continuously driven through the driving system of the previous ratio and thus the necessary synchronizing time does not involve any corresponding power-off period which is one important distinction between this invention and conventional "synchro-mesh" systems. Actually, the only power-off interval will be that required for the movement of the piston 15 (approximately $\frac{1}{16}''$) which transfers the drive from one ratio to another by transfer from one friction clutch to the other (the shift or selector clutches of both ratios being simulaneously engaged at this point). It is intended that this ratio transfer from one friction clutch to the other shall be so rapid that the engine may be maintained at full power without excessive acceleration. The inertia of the flywheel 10 will control the degree of acceleration and it is pointed out that engine power is stored in the flywheel during any such acceleration and is available for extra torque when the friction clutch transfer occurs, as is specially desirable in the case of an up-shift. In the case of a down-shift, such acceleration tends to synchronize the friction clutch to be engaged, which is turning at faster-than-engine-speed when (down-shift) synchronization of the associated shift member is complete.

Figures 7, 8, 9, 10, 11:
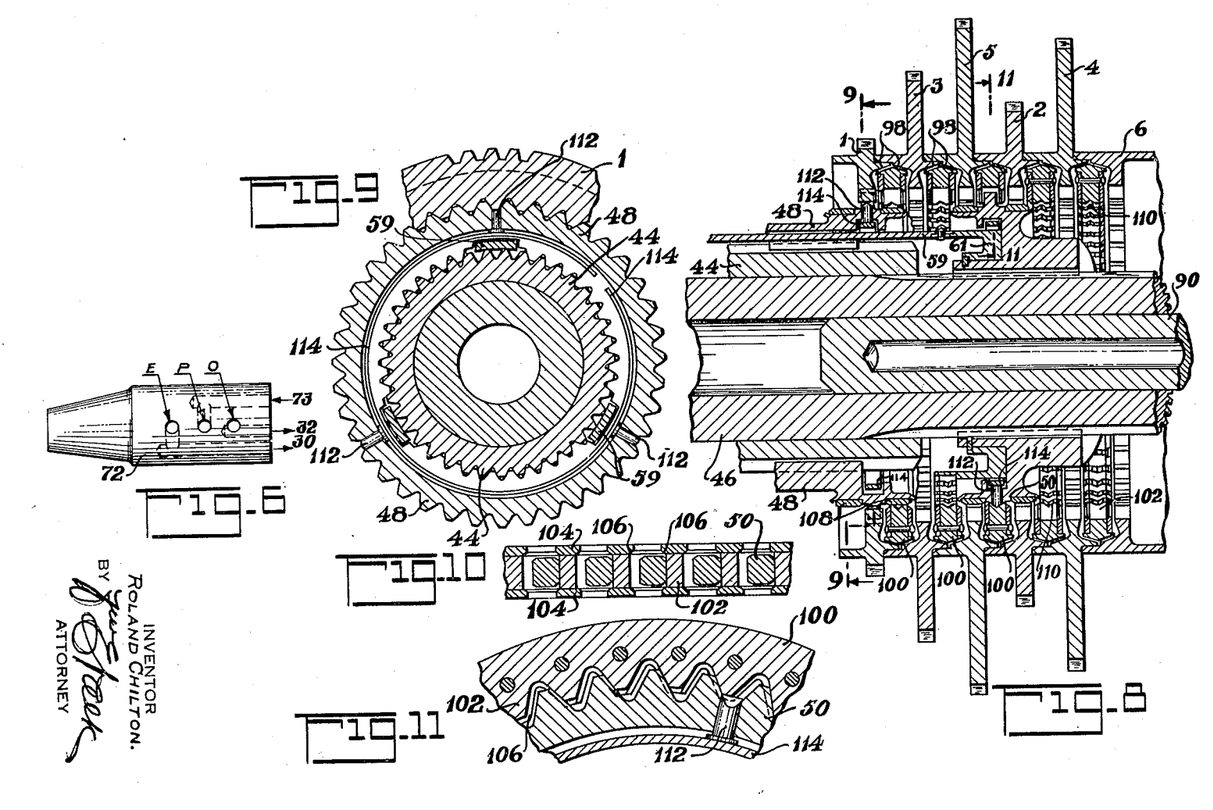
Figure 8 is a fragmentary enlarged axial section showing the synchronizers.
Figure 9 is a section on the line 9—9 of Figure 8.
Figure 10 is a developed fragmentary section on the pitch line of the synchronizer clutch teeth.
Figure 11 is a fragmentary section on the line 11—11 of Figure 8.

The synchronizing devices are shown to enlarged scale in the fragmentary views Figures 8 to 11, inclusive. Referring first to Figure 8, the gears 1, 3, 5, 2, 4, 6 are seen to have coned clutch faces 98 formed on both sides (at least as far as the intermediate gears are concerned), and spaced intermediate the adjacent gears for cooperation with said coned clutch faces are identical synchronizer members comprising a central element 100 having internal teeth 102 which the teeth of the selector clutches 48 and 50 may engage and/or pass through. Externally, the synchronizer members have coned clutch faces adapted to engage the coned clutch faces 98 of the gears. Each synchronizer member has secured on either side toothed plates 104 (better seen in the enlarged views of Figures 10 and 11). The tooth widths of the synchronizer members 100 are narrowed to widen the tooth spaces to allow some rotational clearance or backlash with respect to the engaging teeth of the selector members 48 and 50 but, as seen in the development of Figure 10, the side plates 104 only have normal backlash or tooth space width adapted to pass the teeth of selector members 48 and 50 on alignment. In other words, the plates 104 comprise shoulders 106, which may be slightly bevelled as shown, which shoulders act as stops so that whenever there is synchronizing torque from the friction cones 98 forcing the teeth of selector members 48 and 50 to one side or the other of their backlash within the synchronizing member teeth, these shoulders 106 act as stops inhibiting meshing movement by resisting whatever force be applied by the shifting means. This force, however, engages the cone clutch of the gear about to be engaged thus exerting frictional synchronizing torque until the selector member in question is brought to the speed of the gear to be engaged. When this synchronized condition occurs, the acceleration of the synchronizing member and its associated clutch plate 36 or 38 has ceased and the acceleration torque, which was previously holding the teeth of the selector member in question to one side of their backlash, falls to zero and, accordingly, the shifting effort is able to force the selector teeth 48 to pass the bevelled shoulders 106 on the teeth of the side plates 104 and engage with the teeth of the synchronized gear.

In Figure 8, the lefthand or "odd" selector clutch 48 is shown in mesh with the teeth of the gear 1 and bearing bands 108 are arranged on each side of the selector teeth so that one of these is centralizing and carrying the adjacent synchronizer member 100 in virtue of a close running fit between said band and the tops of the synchronizer teeth. This bearing band normally carries the adjacent synchronizer member so that it rotates with the selector clutch which will next engage it, under which condition the synchronizer member is free to float out of any pressure contact with the associated clutch cones. However, should shifting motion be initiated at the selector clutch 48 (to the right, for instance) its teeth will, in general, first collide with the teeth of the unitarily rotating synchronizer member as the teeth will not usually happen to be lined up. The shift pressure, however, will force the synchronizer cone into contact with the cone of the gear being approached, which gear is traveling at different speed to the selector. Such contact with the friction cones will rotate the synchronizer member relative to the selector (by rotation on the band 108) and instantly the next gear tooth space is aligned, the selector will pass on into the synchronizer teeth, i. e., the condition shown in Figure 8 for the righthand selector 50.

The inner diameter of "tops" of the synchronizer teeth are provided with circumferential V notches 110 with which cooperate radial plungers 112 urged outwardly by a spring ring 114. Accordingly, these spring-urged plungers expand into the notches thus centralizing the teeth 48 between the side plates 106 and providing for a necessary initial axial force whereby continued axial shifting movement carries the synchronizer into initial contact with the friction cone of the gear to be meshed. Such friction engagement immediately generates synchronizing torque between the teeth of the selector and the synchronizer, forcing these teeth to one side of their backlash as shown in Figure 10, so that further axial shifting motion is balked by the shoulders 106, as previously described. Such balking action maintains until the parts are synchronized, whereupon the synchronizing torque ceases and the selector tooth 48 is free to slide over the sloping shoulders 106 and through the appropriate side plate 104 into engagement with the synchronized gear.

Novel features of this inhibitor synchronizer device reside in providing an organization which permits through-shift of the selector along a series of gears. It will be noted that this organization permits the selectors to approach and mesh the several gears from either side and that the selectors further may approach the several synchronizers from either side and furthermore these selectors may disengage the several gears and synchronizers to either side. This is in distinction to conventional synchronizing devices where selector clutches are used between only a pair of gears each of which, accordingly, is only engaged and disengaged from and to one side and there is no occasion for the selector to be able to pass on serially through the gears or synchronizers. In short, the conventional systems have been developed to suit a "gate" shift where each shift clutch serves only two speeds, in contradiction to the present straight-through or serial shift wherein one selector may serve and pass through any desired number of gears. The provisions for such a through-shift and one wherein a pair of concentric selectors serve any desired plurality of gears through a pair of reciprocally engageable concentric friction clutch elements are important features of the present invention.

The cam-valve assembly 34 is rotated through a pinion 116, engaged by a quadrant gear 118, the quadrant including notches 120 spaced one gear-shift increment apart and engaged by a roller 122 carried in a spring-loaded latching plunger 124, mounted on a rigid rod 126. The quadrant 118 swings on a shaft 128 which may be operated by a suitable hand lever connection 130, in the case of manual shift. The profiles of the notches 120 are such that, when sufficient shifting pressure has been applied to the quadrant 118 to overcome the restraint of the spring plunger 124, the quadrant will tend to snap smartly to the next gear station, except as the shift may be temporarily balked by the synchronizing means already described, which act conventionally in the respect that the synchronizing force is proportional to the shifting pressure applied to the balking ring.

Figure 2 also shows an automatic hydraulic shifting system including the primary engine driven pump 74 which, in addition to supplying clutch actuating oil to the automatic valving mechanism (previously described) by the duct 73, may also deliver, through a connection 132, to the intake side of a pump 134, which is driven directly from the engine or, as illustrated, indirectly by the engine, for example from one of the transmission output shafts 86 of the transmission so as to run at vehicle-proportional speed. Alternatively, pump 134 may receive oil directly from a source of supply. This pump delivers oil through a duct 136 to the bottom of a hydraulic cylinder 138, past a tapered metering escape valve 140, operated by a Sylphon bellows 142, subject to engine manifold pressure, supplied through the connection 144 and acting against opposed springs 146, which are adjustable or controllable as to spring setting through an arm 148.

The cylinder 138 is provided with a piston 150 within which is a shift rod 152 engaging a lever 154 rigid with the quadrant 118. The lower end of the rod 152 has a head 156 operated, on upward motion of the piston 150, through a spring 158 against the opposed downward pressure of a spring 160, adjustable by a nut 162. It will be seen that, with any given setting of the leakage valve 140, the pressure beneath the piston 150 will be proportional to the speed of the pump 134, i. e., to the speed of the vehicle or of the driven shaft of the transmission. Such pressure will increase as the vehicle speed increases compressing the spring 158 until the force exerted on the rod 152 is sufficient to overcome the restraint on the quadrant due to the spring loaded latching roller 152, at which instant the quadrant 118 will be snapped upwardly rotating the cam 34 and initiating an upshift, until the balking ring of the associated synchronizer is encountered, whereupon the motion is temporarily arrested while the shift pressure devolves upon the synchronizer thus producing synchronization, whereupon the shift is promptly completed by elastic recovery of the spring 158. Similarly, as the vehicle slows down in speed, and therefore the pressure from the pump 134 decreases so that less of the pressure of the spring 160 is balanced by the spring 158 and when a sufficient degree of unbalance exists, the restraint of the spring detent roller 122 is again overcome and a downshift is initiated. The rate of leakage at the valve 140 determines the degree of pressure generated by the pump 134 for any given vehicle speed and the position of this metering valve 140 is biased by the pressure existing in the Sylphon bellows 142 which is subject to pressure from the intake manifold of the associated engine. This pressure is closely proportional to the instant torque being developed by the engine so that the control is urged towards an up-shift responsively to increasing vehicle speed and towards a downshift by increasing engine torque. The ratio of these two opposing urgencies, i. e., the automatic shift characteristics of the transmission with respect to the vehicle speed and engine torque may be varied over a wide range by adjustment of the following elements:

(a) The spring 160 which urges the shift towards first gear. Increased spring pressure adjustment will delay the up-shift with respect to vehicle speed.
(b) Adjustment of the arm 148 to change the pressure from the springs 146 and thus change the leakage rate at the valve 140 for any specific engine manifold pressure and torque. A manual control may be applied to the arm 148 whereby servo-shifting through the hydraulic system may be manually controlled or initiated by over-riding the Sylphon 142 and controlling the leakage at the valve 140 at will.
(c) Adjustment of the spring load on the latching plunger 124 will control the "spread" between successive shifts both with respect to engine torque and vehicle speed response.

In combination, these adjustments and/or controls may be utilized to vary the shift characteristics over any desirable range.

It will be seen that when the vehicle comes to rest, the booster pump 134 ceases to deliver any pressure beneath the piston 150 and, accordingly, the spring 160 will by this time have returned the valving cam 34 to the neutral position, the oil beneath the piston 150 escaping through valve 140. This condition corresponds to the lower end of the cam tracks as shown in the developed view of Figure 3. At this end, the tracks are extended, as shown, and this is correlated with the valving ports so that in this condition oil pressure is cut off from both sides of the clutch piston 15 whereby both the friction clutches 36 and 38 are disengaged and the engine may run without driving the vehicle. With the vehicle at rest, the pump 134 delivers no pressure so that a manual control is necessary to shift into first gear. For this purpose the handle 130 may be operated to impart initial shifting movement to cam 34 to its first speed position whereupon a drive through gear 1 is provided, as previously described. Once the vehicle is in motion, the pump 134 supplies oil pressure and the automatic hydraulic shifting mechanism just described becomes operative.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a multi-speed transmission, a co-axial series of gears and interspaced frictionally cooperating synchronizer members all having teeth, and a selector member having a set of teeth shiftable back and forth through said series of gears and interspaced synchronizer members to engage and disengage said set of teeth with said synchronizer and gear teeth from either side.

2. In a multi-speed transmission, a co-axial series of gears and interspaced frictionally cooperating synchronizing members all having teeth, a selector member shiftable back and forth through said series to engage and disengage said teeth from either side, and balking means preventing disengagement of any of said synchronizing members by said selector member until synchronization is attained.

3. In a multi-speed transmission, a toothed selector member, an axial assembly of gears serially engageable by said selector, friction faces formed on each side of respective gears to comprise opposed pairs between adjacent gears, and a synchronizing member frictionally cooperable with each said pair and provided with teeth into and through which said selector may be shifted to engage an adjacent gear, said synchronizer teeth having end shoulders adapted to balk said shift in either axial direction until the friction has produced synchronization with the gear to be engaged.

4. In a multi-speed transmission, a series of gears having teeth axially separated by neutral spaces, a selector member serially engageable with said teeth, synchronizing members in said spaces having teeth engageable and disengageable by said selector member from either side, opposed friction surfaces on said synchronizing members, and cooperating surfaces on respective gears and balking shoulders on said members preventing the selector member from engaging a selected gear while synchronizing torque persists.

5. In a multi-speed transmission, a plurality of gears having axially spaced similar teeth, a selector serially engageable with said teeth by axial shift through one to the other, and synchronizing members disposed between said gears in frictional synchronizing cooperation therewith and having balking shoulders adapted to transmit synchronizing friction pressure from said selector member and to release said selector member when the synchronizer friction torque ceases.

6. In a multi-speed transmission, a series of interspaced gears and synchronizer members, and a selector member having a set of teeth, said selector member being selectively shiftable from engagement of its said set of teeth with one gear into engagement with an adjacent gear through a synchronizer member and selectively shiftable through said adjacent gear to the next synchronizer member, said synchronizer members being adapted to balk shift movement of said selector member into engagement with a selected gear until synchronization has been produced with said gear.

7. In a multi-speed transmission, a series of interspaced gears and synchronizer members, and a selector member having a set of teeth, said selector member being selectively shiftable from engagement of its said set of teeth with one gear into engagement with an adjacent gear through a synchronizer member and selectively shiftable through said adjacent gear to the next synchronizer member, each said synchronizer member being frictionally engageable with the adjacent gears and being adapted to balk shift movement of said selector member into engagement with a selected one of said adjacent gears until the friction engagement of said synchronizer member with said selected gear effects synchronization therewith.

8. In a multi-speed transmission, a series of interspaced gears and synchronizer members, and a selector member having a set of teeth, said selector member being selectively shiftable from engagement of its said set of teeth with one gear into engagement with an adjacent gear through a synchronizer member and selectively shiftable through said adjacent gear to the next synchronizer member, each said synchronizer member being adapted to balk shift movement of said selector member into engagement with a selected one of the gears adjacent to said selector member, said balking action being effective to urge said selector member into frictional engagement with said selected gear and continuing until said frictional engagement effects synchronization of said synchronizer member with said selector member.

9. In a multi-speed transmission, a series of three or more axially spaced annular gears defining an axial opening extending through said series of gears, a shift member slidable within said opening for selective engagement with said gears, annular synchronizer members disposed between adjacent gears, said synchronizer members being adapted to synchronize said shift member with a selected gear prior to engagement therewith.

10. In a multi-speed transmission, a series of three or more axially spaced gears, a selector member selectively shiftable into engagement with said gears, synchronizer members between adjacent gears, said synchronizer members being axially shiftable into frictional engagement with the gear to be engaged in response to shift pressure from said selector member and being adapted to balk shift movement of said selector member until said frictional engagement synchronizes said selector member with the gear to be engaged.

11. In a multi-speed transmission, a series of three or more axially spaced gears, a shift member selectively engageable with said gears, synchronizer members between said gears having teeth engageable by said shift member from either side, friction surfaces on each synchronizer member cooperable with friction surfaces on the adjacent gears, each synchronizer member having balking means operative to transmit pressure from the shift member to cause engagement of the friction surface of the associated synchronizer member with the friction surface of a selected gear and to balk movement of said shift member into engagement with said selected gear until synchronization therewith.

12. In a multi-speed transmission having driving and driven shafts, a series of gears disposed in side-by-side relation providing a plurality of speed drive ratios between said shafts, a synchronizer member between adjacent gears, a gear selector member selectively shiftable into engagement with said gears, said synchronizer member being axially shiftable into frictional engagement with the gear to be engaged in response to shift pressure from said selector member and being adapted to balk shift movement of said selector member until said frictional engagement synchronizes said selector member with the gear to be engaged, yieldable means defining the gear engaging positions of said selector member, and means for automatically shifting said selector member in response to the speed and torque variations of said transmission.

13. In a multi-speed transmission, gears affording several speed ratios between driving and driven shafts, a control piston and a gear shift selector connected for linear motion between high and low speed positions through an intermediate speed position, yielding latch means defining said positions, elastic means urging said piston to low speed position, a pump driven from said driven shaft and delivering fluid pressure to urge said piston towards high-speed position, and a metering valve adapted to reduce said pressure responsively to increasing torque on said driving shaft.

14. In a multi-speed transmission for an internal combustion engine, a driven shaft, a stepped variable-ratio gear set for said shaft, a gear shift member resiliently biased in a down-shift direction, yieldable means defining the gear engaging positions of said shift member, a control piston having a resilient connecton with said shift member, a fluid pressure pump driven from said engine and operable to apply fluid pressure against said piston to urge said piston and shift member in an up-shift direction, and a bleed valve for said fluid pressure operative to reduce said fluid pressure in response to increasing pressure in the engine intake manifold.

15. Control means for a multi-speed transmission drivably connected to an engine, said control means comprising a member movable to shift the speed-ratio of said transmission, yieldable latch means defining the speed-ratio positions of said member, a piston, resilient means operatively connecting said piston to said shift member, a pump drivably connected to said engine and arranged to provide a fluid pressure for urging said piston and therefore said shift member in an up-shift direction, means providing a pressure relief orifice for the output of said pump, and means dependent on a condition of engine operation for automatically varying the effective size of said orifice.

16. Control mechanism for a multi-speed transmission; said mechanism comprising a member movable to shift the speed-ratio of said transmission, said shift member having a plurality of spaced notches being movable between high and low speed positions through an intermediate speed position; yieldable latch means sequentially engageable with said notches for defining said positions; a piston; resilient means operatively connecting said piston to said shift member; and means operable to provide a variable fluid pressure against said piston for moving said piston in response to changes in said pressure.

17. Control mechanism for a multi-speed transmission having an output shaft and having its input shaft drivably connected to a combustion engine; said mechanism comprising a member movable to shift the speed-ratio of said transmission, said shift member being movable between high and low speed-ratio positions through an intermediate speed-ratio position; yieldable latch means defining said positions; a piston; resilient means operatively connecting said piston to said shift member; a pump drivably connected to one of said shafts and operable to provide an output fluid pressure urging said piston in a speed-ratio-increasing direction; and a valve member movable to increase or decrease said output pressure respectively with decrease or increase of a condition indicative of engine torque.

18. Control mechanism for a multi-speed transmission having an output shaft and having its input shaft drivably connected to an engine; said mechanism comprising a pump drivably connected to one of said shafts; a member movable in response to changes in the output pressure of said pump for varying the speed ratio of said transmission; means providing a pressure relief orifice for the output fluid of said pump; and a valve member automatically movable with changes in a condition indicative of engine torque for controlling the effective size of said orifice.

19. Control mechanism for a multi-speed transmission having an output shaft and having its input shaft drivably connected to a combustion engine; said mechanism comprising a pump drivably connected to one of said shafts; a member movable in response to changes in the output pressure of said pump for varying the speed ratio of said transmission, said member being urged in a speed-ratio-increasing direction by said output pressure; yieldable means for urging said member in the opposite direction; means providing a pressure relief orifice for the output fluid of said pump; and a valve member automatically movable with increase or decrease of the engine intake air pressure for respectively increasing or decreasing the effective size of said orifice.

20. In a multi-speed transmission; a series of three or more spaced co-axial annular gears defining an axial opening extending through said series of gears, said gears having similar internal teeth; a shift member having a set of teeth, said shift member being slidable within said opening for selective engagement of its set of teeth with the teeth of said gears; and annular synchronizer members disposed between adjacent gears, said synchronizer members being adapted to synchronize said shift member with a selected gear prior to engagement of said shift member set of teeth with the teeth of said gear.

21. Control mechanism for a multi-speed transmission; said mechanism comprising a member movable to shift the speed ratio of said transmission, said member having a plurality of notches; yieldable latch means sequentially engageable with said notches for defining the speed ratio positions of said member; a fluid motor having a piston; resilient means operatively connecting said piston to said member; and means including a pump for providing a variable fluid pressure against said piston for causing movement of said piston in response to changes in said pressure.

22. Control mechanism for a multi-speed transmission drivably connected to an internal combustion engine; said control mechanism comprising a pump drivably connected to said engine; a fluid motor having a piston movable to vary the transmission speed ratio and urged in a speed-ratio-increasing direction by the output fluid pressure of said pump; means for urging said piston in the opposite direction against said pressure; means movable for varying the output fluid pressure of said pump; and means responsive to high engine intake pressure for effecting operation of said movable means for decreasing said pressure.

23. Control mechanism for a multi-speed transmission drivably connected to an internal combustion engine; said control mechanism comprising a pump drivably connected to said engine; a fluid motor having a piston movable to vary the transmission speed ratio and urged in a speed-ratio-increasing direction by the output fluid pressure of said pump; means for urging said piston in the opposite direction against said pressure; means providing a pressure relief orifice for the output fluid of said pump; and means responsive to high engine intake pressure for increasing the effective size of said orifice.

24. In combination with an engine; a stepped multi-speed transmission drivably connected to said engine and having a speed ratio shift member; yieldable latch means defining the speed ratio positions of said member; a fluid motor having a piston; means including resilient means connecting said piston to said shift member; and a pump drivably connected to said engine and arranged to provide a fluid pressure for urging said piston and therefore said shift member in a speed-ratio-increasing direction.

25. In combination with an engine; a stepped multi-speed transmission drivably connected to said engine and having a speed-ratio shift member; yieldable latch means defining the speed ratio positions of said member; a fluid motor having a piston; means including resilient means connecting said piston to said shift member; a pump drivably connected to said engine and arranged to provide a fluid pressure for urging said piston and therefore said shift member in a speed-ratio-increasing direction; means providing a pressure relief orifice for said fluid; and means for varying the effective size of said orifice in response to changes in an operating condition of said engine.

26. In combination; a member to be shifted back and forth having spaced notches; a detent; spring means urging said detent toward said member for selective engagement of said detent with said notches; actuating means shiftable back and forth for moving said member; and means including spring means operatively connecting said actuating means and member so that movement of said actuating means in either direction strains said connecting spring means to provide a force on said member urging said member against the restraint offered by said detent, the direction of said force depending on the direction of movement of said actuating means and the magnitude of said force increasing with increase of said movement until said force is sufficient to overcome said restraint whereupon said member is shifted by said force to bring another of said notches into engagement with said detent and said shift movement of said member relieves said strain and the force produced thereby.

ROLAND CHILTON.

(References on following page)

REFERENCES CITED

The following references are of record in the file of this patent:

UNITED STATES PATENTS

| Number | Name | Date |
|---|---|---|
| 778,548 | Rice | Dec. 27, 1904 |
| 784,352 | Rushmore | Mar. 7, 1905 |
| 907,711 | Anthony | Dec. 29, 1908 |
| 941,426 | Loudon | Nov. 30, 1909 |
| 1,199,640 | Vincent | Sept. 26, 1916 |
| 1,209,352 | Stortz | Dec. 19, 1916 |
| 1,818,910 | Sanine | Aug. 11, 1931 |
| 2,086,563 | Lewis | July 13, 1937 |
| 2,086,564 | Lewis | July 13, 1937 |
| 2,102,781 | Bieretz | Dec. 21, 1937 |
| 2,348,763 | Syrovy et al. | May 16, 1944 |
| 2,352,212 | Lang et al. | June 27, 1944 |
| 2,523,726 | Seeger | Sept. 26, 1950 |
| 2,528,585 | Farkas et al. | Nov. 7, 1950 |

FOREIGN PATENTS

| Number | Country | Date |
|---|---|---|
| 278,327 | Germany | Sept. 24, 1914 |